(12) United States Patent
Rahmouni et al.

(10) Patent No.: US 11,393,125 B1
(45) Date of Patent: Jul. 19, 2022

(54) SYSTEMS AND METHODS FOR DYNAMIC OPTICAL MEDIUM CALIBRATION

(71) Applicant: GoPro, Inc., San Mateo, CA (US)

(72) Inventors: Nicolas Rahmouni, San Mateo, CA (US); Maxim Karpushin, Paris (FR); Thomas Derbanne, Paris (FR)

(73) Assignee: GoPro, Inc., San Mateo, CA (US)

( * ) Notice: Subject to any disclaimer, the term of this patent is extended or adjusted under 35 U.S.C. 154(b) by 307 days.

(21) Appl. No.: 16/707,419

(22) Filed: Dec. 9, 2019

(51) Int. Cl.
*G06T 7/80* (2017.01)
*H04N 17/00* (2006.01)

(52) U.S. Cl.
CPC ............. *G06T 7/80* (2017.01); *H04N 17/002* (2013.01); *G06T 2207/10004* (2013.01)

(58) Field of Classification Search
CPC ............ G06T 7/80; G06T 2207/10004; H04N 17/002
See application file for complete search history.

(56) References Cited

U.S. PATENT DOCUMENTS

| | | | | |
|---|---|---|---|---|
| 9,113,083 B1* | 8/2015 | Chou | ................... | G06T 7/85 |
| 9,639,935 B1* | 5/2017 | Douady-Pleven | ..... | H04N 19/85 |
| 10,269,257 B1* | 4/2019 | Gohl | ..................... | G05D 1/106 |
| 10,341,564 B1* | 7/2019 | Derbanne | .......... | H04N 5/23258 |
| 10,341,647 B2* | 7/2019 | Koesters | ................ | H04N 5/217 |
| 10,432,864 B1* | 10/2019 | Douady | ............... | H04N 5/2253 |
| 10,460,473 B1* | 10/2019 | McMichael | .......... | H04N 17/002 |
| 10,499,038 B2* | 12/2019 | Protter | ................. | H04N 17/002 |
| 10,552,983 B1* | 2/2020 | Slobodyanyuk | .......... | G06T 7/80 |
| 10,664,994 B2* | 5/2020 | Liu | ..................... | H04N 17/002 |
| 10,719,957 B2* | 7/2020 | Zhou | ......................... | G06T 7/80 |
| 10,861,189 B2* | 12/2020 | Potnis | .................. | G06N 3/0472 |
| 11,050,972 B1* | 6/2021 | Derbanne | ............ | H04N 5/2628 |
| 11,064,118 B1* | 7/2021 | Rahmouni | .......... | H04N 5/2628 |
| 11,140,292 B1* | 10/2021 | Rahmouni | ....... | H04N 5/232933 |
| 2015/0215607 A1* | 7/2015 | Chou | ........................ | G06T 7/80 348/208.13 |
| 2016/0072988 A1* | 3/2016 | Campbell | ............ | H04N 5/2254 348/373 |
| 2017/0070732 A1* | 3/2017 | Roulet | ..................... | G02B 13/06 |
| 2018/0143514 A1* | 5/2018 | Campbell | .............. | G03B 17/08 |
| 2018/0232907 A1* | 8/2018 | Sung | ..................... | H04N 17/002 |
| 2019/0102910 A1* | 4/2019 | Kaneko | ................ | H04N 17/002 |
| 2019/0137847 A1* | 5/2019 | Mallette | ................ | B64D 47/08 |
| 2019/0178654 A1* | 6/2019 | Hare | ........................ | G06T 7/70 |
| 2019/0197733 A1* | 6/2019 | Liu | ......................... | G03B 37/00 |
| 2020/0090347 A1* | 3/2020 | Ozasa | .................. | H04N 17/002 |

* cited by examiner

Primary Examiner — Brian P Yenke

(74) Attorney, Agent, or Firm — Esplin & Associates, PC

(57) ABSTRACT

An image capture device may be calibrated using calibration parameters. Optical medium through which the image capture device captures images may be changed. The calibration parameters of the image capture device may be dynamically modified to account for the change in the optical medium. The image capture device may be operated in accordance with the modified calibration parameters to capture images through the optical medium.

20 Claims, 5 Drawing Sheets

SYSTEMS AND METHODS FOR DYNAMIC OPTICAL MEDIUM CALIBRATION

FIELD

This disclosure relates to dynamically changing calibration parameters of an image capture device to capture images through an optical medium.

BACKGROUND

Certain features of an image capture device, such as electronic image stabilization, leveling, stitching, and/or image analysis, require precise calibration of the optical characteristics (e.g., optical element characteristics) of the image capture device. Improper calibration (e.g., due to change in characteristics of the optical element, change in optical element used, change in environment of the image capture device, such as being immersed in water) may cause such features of the image capture device to perform poorly. For example, improper calibration of the optical characteristics may result in distorted stabilization, missing correspondence between lenses in stitching, and/or insufficient/excessive image corrections (e.g., chromatic aberration correction, vignetting correction).

SUMMARY

This disclosure relates to dynamic optical medium calibration. Rotational position information, image information, operating calibration information, and/or other information may be obtained. The rotational position information may characterize rotational positions of an image capture device as a function of progress through a capture duration. The rotational positions of the image capture device may include a first rotational position of the image capture device at a first moment within the capture duration, a second rotational position of the image capture device at the second moment within the capture duration, and/or other rotational positions of the image capture device. The image information may define images of a scene captured by the image capture device through an optical medium during the capture duration. The images may include a first image captured at the first moment within the capture duration, a second image captured at the second moment within the capture duration, and/or other images. The first image and the second image may include one or more pixels depicting an object within the scene. The pixel(s) may be located at a first position within the first image based on the first rotational position of the image capture device at the first moment, and the pixel(s) may be located at a second position different from the first position within the second image based on the second rotational position of the image capture device at the second moment.

The operating calibration information may define one or more calibration parameters of the image capture device to capture the images through the optical medium during the capture duration. The operating calibration information may enable prediction of a change in position of the pixel(s) from the first position within the first image to a predicted position within the second image based on the first rotational position of the image capture device at the first moment, the second rotational position of the image capture device at the second moment, and/or other information. One or more modified calibration parameters of the image capture device to capture additional images through the optical medium may be determined based on the second position of the pixel(s) within the second image, the predicted position of the pixel(s) within the second image, and/or other information. Operation of the image capture device may be effectuated based on the modified calibration parameter(s) and/or other information.

A system that performs dynamic optical medium calibration may include one or more electronic storages, one or more processors, and/or other components. An electronic storage may store position information, information relating to positions of an image capture device, image information, information relating to images, information relating to the image capture device, calibration information, information relating to calibration parameters of the image capture device, information relating to modified calibration parameters of the image capture device, information relating to operation of the image capture device, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate dynamic optical medium calibration. The machine-readable instructions may include one or more computer program components. The computer program components may include one or more of a position information component, an image information component, a calibration component, a modified calibration component, an operation component, and/or other computer program components.

The position information component may be configured to obtain rotational position information of an image capture device and/or other information. The rotational position information may characterize rotational positions of the image capture device as a function of progress through a capture duration. The rotational positions of the image capture device may include a first rotational position of the image capture device at a first moment within the capture duration, a second rotational position of the image capture device at the second moment within the capture duration, and/or rotational positions of the image capture device.

The image information component may be configured to obtain image information and/or other information. The image information may define images of a scene captured by the image capture device through an optical medium during the capture duration. The images may include a first image captured at the first moment within the capture duration, a second image captured at the second moment within the capture duration, and/or other images. The first image and the second image may include one or more pixels depicting an object within the scene. The pixel(s) may be located at a first position within the first image based on the first rotational position of the image capture device at the first moment, and the pixel(s) may be located at a second position different from the first position within the second image based on the second rotational position of the image capture device at the second moment.

In some implementations, the optical medium may include an optical element set of the image capture device. The optical element set may include one or more optical elements of the image capture device and one or more optical element extensions installed on the image capture device. The optical element set may include one or more interchangeable optical elements installed on the image capture device.

In some implementations, the optical medium may include one or more substances in an environment of the image capture device. For example, the image capture device may be located under water and the substance(s) in the environment of the image capture device may include water in front of an optical element of the image capture device.

The calibration component may be configured to obtain operating calibration information of the image capture device and/or other information. The operating calibration information may define one or more calibration parameters of the image capture device to capture the images through the optical medium during the capture duration. The operating calibration information may enable prediction of a change in position of the pixel(s) from the first position within the first image to a predicted position within the second image based on the first rotational position of the image capture device at the first moment, the second rotational position of the image capture device at the second moment, and/or other information.

The modified calibration component may be configured to determine one or more modified calibration parameters of the image capture device to capture additional images through the optical medium based on the second position of the pixel(s) within the second image, the predicted position of the pixel(s) within the second image, and/or other information. In some implementations, the modified calibration parameter(s) may be determined based on a difference between the second position of the pixel(s) within the second image, the predicted position of the pixel(s) within the second image, and/or other information.

In some implementations, determination of the modified calibration parameter(s) based on the second position of the pixel(s) within the second image and the predicted position of the pixel(s) within the second image may include determination of the modified calibration parameter(s) based on a first optical flow corresponding to the second position of the pixel(s) within the second image, a predicted optical flow corresponding to the predicted position of the pixel(s) within the second image, and/or other information.

In some implementations, the modified calibration parameter(s) may be determined based a classification approach. The classification approach may include selection of the modified calibration parameter(s) from among predefined calibration parameters. In some implementations, the modified calibration parameter(s) may be determined based a regression approach. The regression approach may include iterative adjustments of the calibration parameter(s).

The operation component may be configured to effectuate operation of the image capture device based on the one or more modified calibration parameters and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
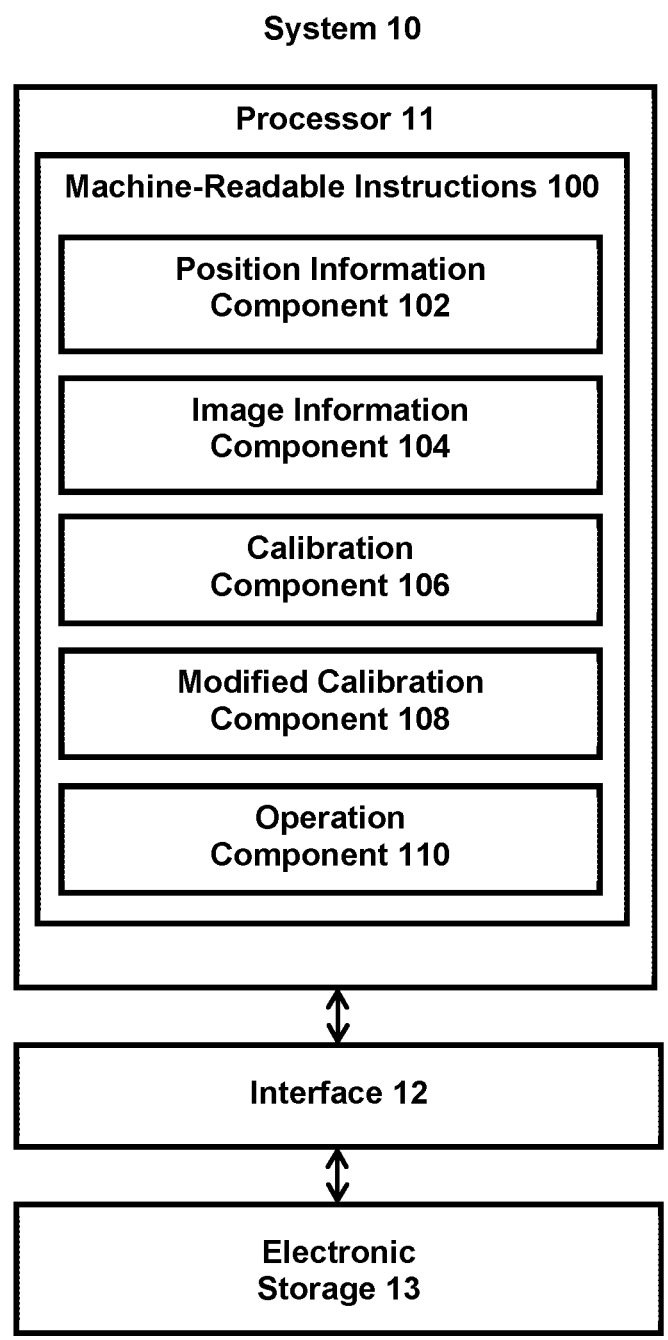
FIG. 1 illustrates an example system that performs dynamic optical medium calibration.

FIG. 1 illustrates a system 10 for dynamic optical medium calibration. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Rotational position information, image information, operating calibration information, and/or other information may be obtained by the processor 11. The rotational position information may characterize rotational positions of an image capture device as a function of progress through a capture duration. The rotational positions of the image capture device may include a first rotational position of the image capture device at a first moment within the capture duration, a second rotational position of the image capture device at the second moment within the capture duration, and/or other rotational positions of the image capture device. The image information may define images of a scene captured by the image capture device through an optical medium during the capture duration. The images may include a first image captured at the first moment within the capture duration, a second image captured at the second moment within the capture duration, and/or other images. The first image and the second image may include one or more pixels depicting an object within the scene. The pixel(s) may be located at a first position within the first image based on the first rotational position of the image capture device at the first moment, and the pixel(s) may be located at a second position different from the first position within the second image based on the second rotational position of the image capture device at the second moment.

The operating calibration information may define one or more calibration parameters of the image capture device to capture the images through the optical medium during the capture duration. The operating calibration information may enable prediction of a change in position of the pixel(s) from the first position within the first image to a predicted position within the second image based on the first rotational position of the image capture device at the first moment, the second rotational position of the image capture device at the second moment, and/or other information. One or more modified calibration parameters of the image capture device to capture additional images through the optical medium may be determined by the processor 11 based on the second position of the pixel(s) within the second image, the predicted position of the pixel(s) within the second image, and/or other information. Operation of the image capture device may be effectuated by the processor 11 based on the modified calibration parameter(s) and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store position information, information relating to positions of an image capture device, image information, information relating to images, information relating to the image capture device, calibration information, information relating to calibration parameters of the image capture device, information relating to modified calibration parameters of the image capture device, information relating to operation of the image capture device, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate dynamic optical medium calibration. The machine-readable instructions 100 may include one or more computer program components. The machine-readable instructions 100 may include one or more of a position information component 102, an image information component 104, a calibration component 106, a modified calibration component 108, an operation component 110, and/or other computer program components.

Visual content may refer to content of image(s), video frame(s), and/or video(s) that may be consumed visually. For example, visual content may be included within one or more images and/or one or more video frames of a video. A video frame may refer to one or more of an image frame, frame of pixels, encoded frame (e.g., I-frame, P-frame, B-frame), and/or other types of video frame. The video frame(s) may define the visual content of the video. That is, video may include video frame(s) that define the visual content of the video. Video frame(s) may define visual content viewable as a function of progress through the progress length of the video content. A video frame may include an image of the video content at a moment within the progress length of the video.

Visual content (of image(s), of video frame(s), of video(s)) with a field of view of one or more scenes may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects).

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
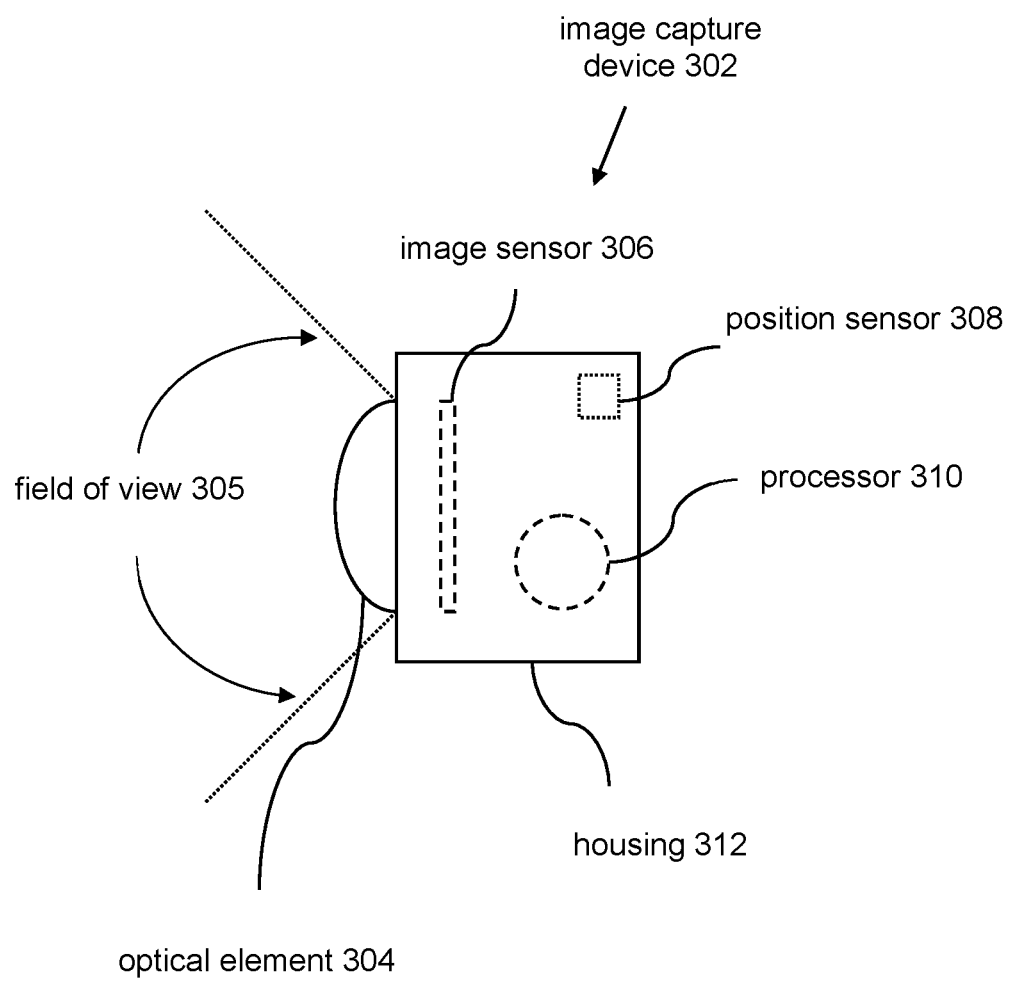
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) an optical element 304, an image sensor 306, a position sensor 308, a processor 310, and/or other components.

One or more components of the image capture device 302 may be the same as, be similar to, and/or correspond to one or more components of the system 10. For example, the processor 310 may be the same as, be similar to, and/or correspond to the processor 11. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

In some implementations, the optical element 304 may form and/or be part of an optical element set of the image capture device 302. An optical element set may include one or more optical elements. Optical element(s) of an optical element set(s) may guide light within a field of view to an image sensor. For example, the optical element set of an image capture device may include one or more optical elements of the image capture device (e.g., the optical element 304), one or more optical element extensions installed on the image capture device, and/or other optical elements. An optical element extension may refer to an optical element part that is added to the image capture device to change one or more optical characteristics of the image capture device. For instance, one or more optical element extensions may be installed on the image capture device 302 to change the optical characteristics of the image capture device 302 (e.g., change field of view, change light distortion). Installing an optical element extension on the image capture device may include installing the optical element extension on the housing of the image capture device, installing the optical element extension on the optical element of the image capture device, and/or otherwise installing the optical element extension on the image capture device. For instance, one or more optical element extensions may be installed over or on-top of the optical element 304. An optical element extension may be installed on the image capture device via one or more of mechanical coupling, magnetic coupling, electric coupling, and/or other coupling.

As another example, the optical element set of an image capture device may include one or more interchangeable optical elements installed on the image capture device. An interchangeable optical element may refer to an optical element that may be exchanged with one or more other optical elements of the image capture device. Interchangeable optical element(s) may be installed on an image capture device to change the optical characteristics of the image capture device (e.g., change field of view, change light distortion). For example, an interchangeable optical element may include a lens (swappable lens) that can be switched with a lens of the image capture device. For instance, the optical element 304 may be an interchangeable optical element that is configured to be installed on and uninstalled from the housing 312.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The position sensor 308 may include sensor(s) that measures experienced positions and/or motions. Positions may include rotational positions (orientations) and/or translational positions. Motions may include rotational motions (changes in orientation) and/or translational motions (e.g., forward/backward motion, left/right motion, up/down motion). The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration. The position information may include rotational position information characterizing rotational position of the image capture device 302, translational position information characterizing translational position of the image capture device 302, and/or other position information.

In some implementations, the position information may include data from the position sensor (e.g., gyroscope data, accelerometer data) with time stamps per visual content capture at different moments. For example, the position information may include gyroscope data and/or accelerometer data per individual images/video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

Referring back to FIG. 1, the processor 11 (or one or more components of the processor 11) may be configured to obtain information to facilitate dynamic optical medium calibration. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The position information component 102 may be configured to obtain position information of an image capture device and/or other information. Obtaining position information may include one or more of accessing, acquiring, analyzing, determining, examining, identifying, loading, locating, opening, receiving, retrieving, reviewing, selecting, storing, and/or otherwise obtaining the position information. The position information component 102 may obtain position information from one or more locations. For example, the position information component 102 may obtain position information from a storage location, such as the electronic storage 13, electronic storage of information and/or signals generated by one or more sensors, electronic storage of a device accessible via a network, and/or other locations. The position information component 102 may obtain position information from one or more hardware components (e.g., a position sensor, a hardware component of an image capture device) and/or one or more software components (e.g., software running on a computing device).

The position information component 102 may be configured to obtain position information of the image capture device during acquisition of the images and/or after acquisition of images by the image capture device. For example, the position information component 102 may obtain position information of the image capture device while images are being captured. The position information component 102 may obtain position information of the image capture device after images have been captured and stored in memory (e.g., the electronic storage 13). For example, the position information may be captured and stored by one or more position sensors, and may be obtained by the position information component 102 when dynamic optical medium calibration is performed.

The position information may characterize positions of the image capture device capturing images during the capture duration. Capture duration may include a duration of time during which images are captured by the image capture device. Positions of the image capture device may include rotational positions, translational positions, and/or other positions of the image capture device. Position of an image capture device may refer to how the image capture device is oriented. For example, rotational positions of an image capture device may refer to how the image capture device is oriented/rotated around one or more axis or one or more point, such as a center point. For instance, rotational positions of an image capture device may refer to how the image capture device is rotated about one or more of yaw axis, pitch axis, and/or roll axis. Rotational position information of an image capture device may characterize how the image capture device is rotated (e.g., amount of rotations about the yaw, pitch, and/or roll axis) and/or is being rotated (e.g., speed and/or direction of rotations) at different moments within the capture duration. Translational positions of an image capture device may refer to locations of the image capture device with respect to one or more fixed points. For instance, translational positions of an image capture device may refer to how the image capture device is moving along one or more translational direction (e.g., moving forward, backward, laterally, vertically). Translational position information of an image capture device may characterize how the image capture device is displaced (GPS location, elevation) and/or is being displaced (e.g., speed and/or direction of translational displacement) at different moments within the capture duration.

In some implementations, the position information may characterize the positions of the image capture device during the capture duration based on the position information including rotational position information, translational position information, and/or other position information. The rotational position information may characterize rotational positions of the image capture device as a function of progress through the capture duration. The translational position information may characterize translational positions of the image capture device as a function of progress through the capture duration.

The position information may characterize positions of the image capture device capturing images as a function of progress through the capture duration. The position information may characterize positions of the image capture device by including information that describes, identifies, and/or may be used to characterizes the positions of the image capture device at different moments (e.g., points in time, durations in time) within the capture duration. Other types of position information are contemplated.

The image capture device may be located/oriented in different positions at different moments within the capture duration. For example, the rotational positions of the image capture device within the capture duration may include a first rotational position of the image capture device at a first moment within the capture duration, a second rotational position of the image capture device at the second moment (subsequent the first moment) within the capture duration, and/or rotational positions of the image capture device. The second rotational position may be different from the first rotational position.

Figure 4A:
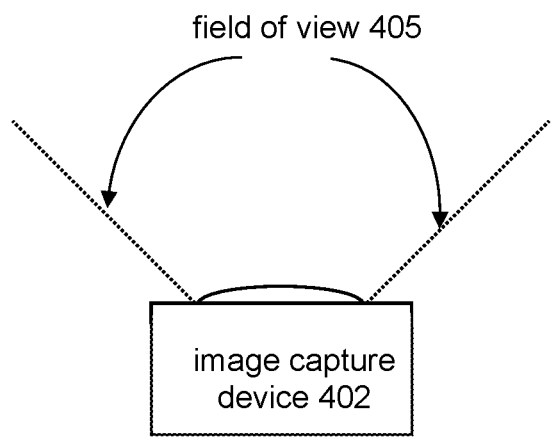
FIGS. 4A and 4B illustrate example rotational positions of an image capture device.
Figure 4B:
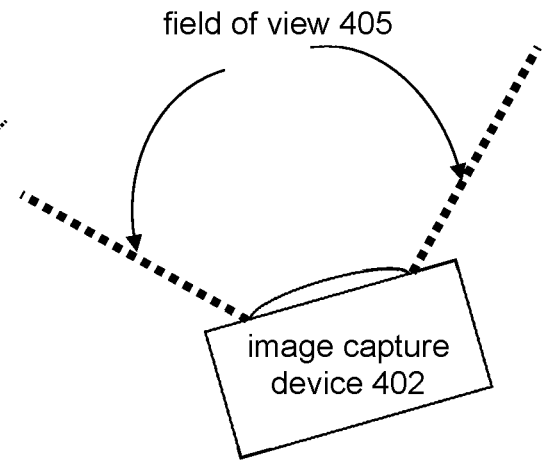

Different positions of the image capture device may cause the image capture device to capture images including depictions of different parts of the scene. For example, FIGS. 4A and 4B illustrate example rotational positions of an image capture device 402. FIG. 4A may illustrate a rotational position of the image capture device 402 at one moment (first moment) within the capture duration, and FIG. 4B may illustrate a rotational position of the image capture device 402 at another/later moment (second moment) within the capture duration.

The image capture device 402 may capture images of a scene within the field of view 405. The difference in the rotational positions of the image capture device 402 between different moments (shown in FIGS. 4A and 4B) may result in the images captured by the image capture device 402 at the corresponding moments including depiction of different parts of the scene. For example, in FIG. 4A, at one moment within the capture duration, the image capture device 402 may be oriented to face a particular direction (e.g., north direction), and the field of view 405 of the image capture device 402 may include an extent of the scene to the north of the image capture device 402. In FIG. 4B, at another (subsequent) moment in the capture duration, the image capture device 402 may be oriented towards the left (e.g., rotated to the left compared to the rotational position shown in FIG. 4A). The field of view 405 of the image capture device 402 may include an extent of the scene left of north of the image capture device 402.

Figure 5A:
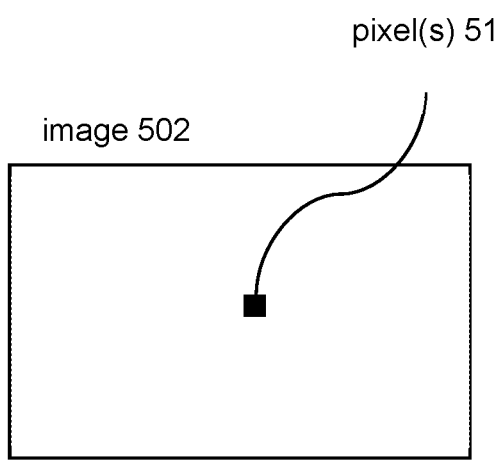
FIGS. 5A and 5B illustrate example images captured by the image capture device from the rotational positions shown in FIGS. 4A and 4B.
Figure 5B:
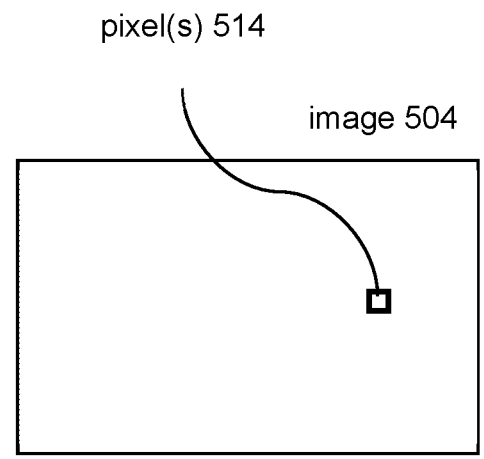

FIGS. 5A and 5B illustrate example images 502, 504 captured by the image capture device from the rotational positions shown in FIGS. 4A and 4B. The image 502 shown in FIG. 5A may be the image captured by the image capture device 402 at one moment (first moment) from the rotational position shown in FIG. 4A. The image 504 shown in FIG. 5B may be the image captured by the image capture devise 402 at another/later moment (second moment) from the rotational position shown in FIG. 4B.

The image information component 104 may be configured to obtain image information and/or other information. Obtaining image information may include one or more of accessing, acquiring, analyzing, determining, examining, identifying, loading, locating, opening, receiving, retrieving, reviewing, selecting, storing, and/or otherwise obtaining the image information. The image information component 104 may obtain image information from one or more locations. For example, the image information component 104 may obtain image information from a storage location, such as the electronic storage 13, electronic storage of information and/or signals generated by one or more sensors, electronic storage of a device accessible via a network, and/or other locations. The image information component 104 may obtain image information from one or more hardware components (e.g., an image sensor, a hardware component of an image capture device) and/or one or more software components (e.g., software running on a computing device).

In some implementations, image information component 104 may obtain image information based on user interaction with a user interface/application (e.g., image capturing application, image viewer/editor application), and/or other information. For example, a user interface/application may provide option(s) for a user to select one or more images from which dynamic optical medium calibration is to be performed. The image information defining the images may be obtained based on the user's selection of the images through the user interface/application. As another example, a user interface/application may provide option(s) for a user to turn on/activate dynamic optical medium calibration. The image information defining the images may be obtained based on the dynamic optical medium calibration being turned on/activated. Other selections of images are contemplated.

The image information may define images of one or more scenes captured by the image capture device through an optical medium during the capture duration. The image information may define image(s) by including information that defines one or more content, qualities, attributes, features, and/or other aspects of the visual content of the images. For example, the image information may define visual content of an image by including information that makes up the content of the image, and/or information that is used to determine the content of the image. For instance, the image information may include information that makes up and/or is used to determine the arrangement of pixels, characteristics of pixels, values of pixels, and/or other aspects of pixels that define visual content of the image. For example, the image information may include information that makes up and/or is used to determine pixels of the image. Other types of image information are contemplated.

The images captured by the image capture device may include different images captured at different moments within the capture durations. At least some of the images may have been captured by the image capture device from different positions (e.g., different rotational positions, different translational positions). For example, the images may include one image (first image) captured at one moment (first moment) within the capture duration, another image (second image) captured at another moment (second moment within) the capture duration, and/or other images. The two images may have been captured by the image capture device from different positions.

For example, FIGS. 5A and 5B illustrate example images captured by the image capture device 402 from the rotational positions shown in FIGS. 4A and 4B. The difference in the rotational positions of the image capture device 402 between different moments (shown in FIGS. 4A and 4B) may result in images 502, 504 captured by the image capture device 402 at the corresponding moments including depiction of different parts of the scene.

The scene may include an object, and the images captured by the image capture device may include one or more pixels depicting the object within the scene. A pixel depicting an object may include the pixel depicting the entirety of the object or one or more portions of the object. For example, the image 502 may include pixel(s) 512 depicting a particular object/particular portion of the object within the scene, and the image 504 may include pixel(s) 514 depicting the same object/same portion of the object within the scene.

The pixel(s) depicting the object may be located at different positions within the images based on the different positions of the image capture device from which the images were captured. For example, the image 502 may include the pixel(s) 512 located at one position (e.g., near the center) within the image 502, and the image 504 may include the pixel(s) 514 located at different position (e.g., right of center) within the image 504. The pixel(s) 512 may be located at its position within the image 502 based on the rotational position of image capture device (shown in FIG.

4A) at the corresponding capture moment. The pixel(s) 514 may be located at its position within the image 504 based on the rotational position of image capture device (shown in FIG. 4B) at the corresponding capture moment. Other rotational positions and other pixel locations are contemplated.

An optical medium may refer to substance through which light travels to reach one or more image sensors of the image capture device. An optical medium may act upon light passing through the optical medium. An optical medium may affect direction, deviation, and/or path of the light passing through the optical medium. An optical medium may include substance that are part of the image capture device and/or substance that are external/not part of the image capture device. For example, the optical medium may include the optical element set of the image capture device. The optical element set may include optical element(s) of the image capture device, optical element extension(s) installed on the image capture device, interchangeable optical element(s) installed on the image capture device, and/or other optical elements. The optical medium may include one or more substances in an environment of the image capture device. For instance, the image capture device may be located under water and the substance(s) in the environment of the image capture device may include water in front of an optical element of the image capture device. Other optical elements and substances are contemplated.

The image capture device may be calibrated to capture visual content through a particular optical element (e.g., lens) of the image capture device. Calibrating the image capture device to capture visual content through an optical element may include calibrating the image capture device based on one or more characteristics of the optical element. A characteristic of the optical element may refer to material, configuration, quality, attribute, feature, type, and/or other aspects of the optical set. A characteristic of the optical element may refer to material, configuration, quality, attribute, feature, type, and/or other aspects of the optical element that affects how the optical element acts upon light passing through the optical element. A characteristic of the optical element set refer to material, configuration, quality, attribute, feature, type and/or other aspects of the optical element that affects direction, deviation, and/or path of the light passing through the optical element.

Calibrating the image capture device to capture visual content through an optical element may include determining and/or setting one or more calibration parameters for the optical element. Calibration parameters may refer to extrinsic parameters, intrinsic parameters, and/or image capture device matrix based on the extrinsic parameters (representing rigid transformation from 3D world coordinate system to 3D image capture device's coordinate system, such as rotation and translation) and intrinsic parameters (representing projective transformation from 3D image capture device's coordinates into 2D image coordinates, such as focal length, optical element, skew coefficient). Calibration parameters may include geometric calibration, which may estimate the parameters of the optical element and the image sensor of the image capture device. Calibration parameters may include distortion coefficients. Calibration parameters may be defined using one or more polynomials and/or one or more coefficients of polynomial(s).

Calibration parameters of the image capture device may be set based on the assumption that the optical element of the image capture device is fixed and that the environment of the image capture device will not affect direction, deviation, and/or path of the light passing through the environment. Such calibration parameters may not be appropriate when there are changes to the optical element and/or the environment of the image capture device affects direction, deviation, and/or path of the light passing through the environment. For example, changing the optical element of the image capture device with a different type of optical element may change how light is received (e.g., how light travels from one point to the image sensor) by the image sensor of the image capture device. Placing light-affecting medium in front of the optical element, such as by submerging the image capture device under water, may change how light is received by the image sensor of the image capture device. For instance, the focal length may change based on the refraction indices of water and air. The refraction indices may change based on the salinity of the water.

The default calibration parameters of the image capture device may not be proper calibration parameters to use in such cases. The default calibration parameters of the image capture device may not take into account the changed characteristics of the optical element and/or the ways in which the environment of the image capture device is affect travel of light, which may result in degraded performance of one or more features (e.g., as electronic image stabilization, leveling, stitching, and/or image analysis) of the image capture device.

The calibration component 106 may be configured to obtain operating calibration information of the image capture device and/or other information. Obtaining operating calibration information may include one or more of accessing, acquiring, analyzing, determining, examining, identifying, loading, locating, opening, receiving, retrieving, reviewing, selecting, storing, and/or otherwise obtaining the operating calibration information. The calibration component 106 may obtain operating calibration information from one or more locations. For example, the calibration component 106 may obtain operating calibration information from a storage location, such as the electronic storage 13, electronic storage of information and/or signals generated by one or more sensors, electronic storage of a device accessible via a network, and/or other locations. The calibration component 104 may obtain operating calibration information from one or more hardware components (e.g., a hardware component of an image capture device) and/or one or more software components (e.g., software running on a computing device/image capture device). For example, the operating calibration information may be stored in an electronic storage of the image capture device and the calibration component 106 may obtain the operating calibration information from the electronic storage. As another example, the calibration component 106 may determine the operating calibration information based on analysis of information relating to the optical element(s) of the image capture device.

The operating calibration information may define one or more calibration parameters of the image capture device. The operating calibration information may define calibration parameter(s) of the image capture device to capture the images through an optical medium during a capture duration. The operating calibration information may define calibration parameter(s) by including information that describes, identifies, is associated with, and/or otherwise defines one or more of value, type, quantity, quality, attribute, feature, and/or other aspects of the calibration parameter(s). For example, the operating calibration information may define calibration parameter(s) of the image capture device by including information that defines calibration polynomial(s) and/or coefficient(s) of calibration polynomial(s). Other types of operating calibration information are contemplated.

The operating calibration information may enable prediction of change in position across different images of pixels depicting the same object in the scene based on different positions from which the images were captured. In some implementations, the calibration parameter(s) defined by the operating calibration information may be determined, and the calibration parameter(s) may be used to predict change in position of pixels. For example, the calibration information/calibration parameter(s) may be used to predict (e.g., estimate, determine) change in position across multiple images of pixel(s) that depict a particular object based on different positions of the image capture device during capture of the individual images. The calibration information/calibration parameter(s) may be used to predict how the motion/optical field should look given particular motion/rotation experienced by the image capture device during capture of images. If the actual motion/optical field within the images do not align with the predicted motion/optical field, then the difference between the actual and the predicted motion/optical field may be used to modify the calibration parameters of the image capture device.

Figure 6:
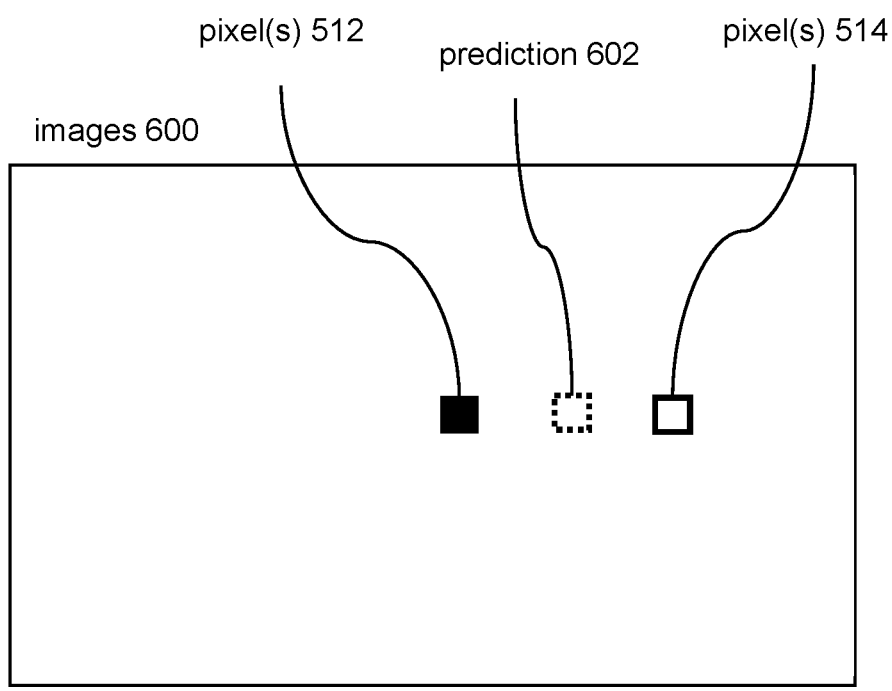
FIG. 6 illustrates example positions of one or more pixels depicting an object.

FIG. 6 illustrates example positions of pixel(s) depicting an object. Images 600 may represent overlap of multiple images, such as overlap of the image 502 (shown in FIG. 5A) and the image 504 (shown in FIG. 5B). The pixel(s) 512 may include pixel(s) of the image 502 that depict a particular object within the scene, and the pixel(s) 514 may include pixel(s) of the image 504 that depict the same object within the scene. The pixel(s) 512, 514 may be located at different positions within the corresponding images based on the different positions of the image capture device from which the images were captured (e.g., the rotational positions shown in FIG. 4B).

In some implementations, the motion of pixels (changes in position of pixels) across the images may be defined within an optical flow field and/or motion vectors (e.g., of the encoded video). For a pixel located at point $m_1$ in image t, the motion of the image capture device may cause the pixel to move to point $m_2$ in image t+1, with $m_2$ given by the equations:

$$m_2 = D(R_{12}D^{-1}(m_1)) \text{ or: } D^{-1}(m_2) = R_{12}D^{-1}(m_1)$$

$$m_2 = m_1 + f_{12}$$

$R_{12}$ may be the motion (e.g., rotation) of the image capture device between capture of the images t, t+1, and $f_{12}$ may be optical flow (vector field) between $m_1$ and $m_2$. D may be a function that projects rays to the optical center to points on the image sensor (mapping 3D coordinates to images sensor). $D^{-1}$ may be a function that performs inverse of D. D and $D^{-1}$ may be modeled by sets of radial polynomial functions and/or other functions. To properly calibrate the image capture device, parameters of D and $D^{-1}$ may be determined.

The calibration information/calibration parameter(s) of the image capture device may be used to predict the change in position of the pixel(s) from the image 502 to the image 504 based on the different positions from which the images were captured. For example, the position sensor of the image capture device may provide information on how much the image capture device has moved from its position in capturing the image 502 to its position in capturing the image 504, and the change in position of the image capture device may be used to estimate/determine where the pixel(s) depicting the object should be located within the image 504. For example, in FIG. 6, the position of the pixel(s) may be predicted to change from the position within the image 502 to the prediction 602 within the image 504 based on the position of the pixel(s) 512 within the image 502, the rotational position of the image capture device at the moment corresponding capture of the image 502, the rotational position of the image capture device at the moment corresponding to capture of the image 504, and/or other information. Other predictions of change in position of pixel(s) across images are contemplated.

As shown in FIG. 6, the prediction 602 of the position of pixel(s) within the image 502 may not be same as the actual position of the pixel(s) 514 within the image 502. The difference between the predicted position and the actual position of the pixel(s) may be due to improper calibration of the image capture device for the optical medium. That is, the calibration parameters of the image capture device may not properly account for how the optical medium affects direction, deviation, and/or path of the light passing through the optical medium.

The modified calibration component 108 may be configured to determine one or more modified calibration parameters of the image capture device to capture additional images through the optical medium. The modified calibration parameter(s) may be determined based on the second position of the pixel(s) within the second image, the predicted position of the pixel(s) within the second image, and/or other information. The modified calibration parameters may properly account for how the optical medium affects direction, deviation, and/or path of the light passing through the optical medium. Determining the modified calibration parameter(s) may enable and/or accomplish dynamic optical medium calibration. Dynamic optical medium calibration may include dynamic calibration of the image capture device to account for the optical medium through which images are captured. For example, optical medium through which the image capture device captures images may change during capture duration and the image capture device may be dynamically calibrated to account for the changes in the optical medium based on the modified calibration parameter(s).

In some implementations, the modified calibration parameter(s) may be determined based on a difference between the second position of the pixel(s) within the second image, the predicted position of the pixel(s) within the second image, and/or other information. For example, referring to FIG. 6, the modified calibration parameter(s) may be determined based on the difference between the position of the pixel(s) 514 within the image 504 and the prediction 602. The difference between the actual and predicted positions of the pixels may include the distance between the actual and predicted positions, the direction between the actual and predicted positions, and/or other difference between the actual and predicted positions of the pixels.

In some implementations, determination of the modified calibration parameter(s) based on the second position of the pixel(s) within the second image and the predicted position of the pixel(s) within the second image may include determination of the modified calibration parameter(s) based on a first optical flow corresponding to the second position of the pixel(s) within the second image, a predicted optical flow corresponding to the predicted position of the pixel(s) within the second image, and/or other information. That is, different optical flow may result between (1) the original position of the pixel(s) within the first image and the actual position of the pixel(s) within the second image (actual optical flow), and (2) the original position of the pixel(s) within the first image and the predicted position of the pixel(s) within the second image (predicted optical flow). The modified calibration parameter(s) may be determined based on the difference between the actual optical flow and the predicted optical flow.

In some implementations, the modified calibration parameter(s) may be determined using/based on the following equation that compares two measurements over available points and over multiple images (frames).

$$E = \sum_{frames:t} \sum_{points:j} \rho\left(\|m_{2,j,t} - D(RD^{-1}(m_{1,j,t}))\|^2\right)$$

In the equation, p may be a robust function, such as the Huber loss function, that addresses/accounts for/deals with noise and/or outliers in the optical flow estimation. The equation may utilize difference between actual position of pixels and predicted position of pixels to determine whether the calibration parameters are correct or not. The question may compute the error between the positions of pixels within images and the modeling of the pixel positions using calibration parameters. If the model properly simulates the optical characteristics of the optical medium, then the error may be calculated to be a low number (e.g., 0). That is, the terms inside the parenthesis may return a low number(s) if the image capture device is properly calibrated. The modified calibration parameter(s) may be determined by choosing/calculating the calibration parameter(s) that returns acceptable error between the predicted positions of pixels and actual positions of pixels.

In some implementations, the modified calibration parameter(s) may be determined based a classification approach. The classification approach may include selection of the modified calibration parameter(s) from among predefined calibration parameters. In the classification approach, the possible calibration parameter(s) may be fixed in advance, and the modified calibration parameter(s) may be selected from the fixed options based on the likelihood of the optical medium state.

For example, parameters of the function D may be represented by θ. In the classification approach, the parameters of the function D may be an element in a set of parameters ($\theta \in \{\theta_1, \theta_2, \ldots, \theta_N\}$). The classification approach may determine the most correct parameters from those contained within the set. For example, measurements from position sensors and from optical flow for the parameters within the set may be compared:

$$\theta = \mathrm{argmin}_i E(\theta_i)$$

In some implementations, the computation may for performed per individual images(frames), and the values may be filtered (e.g., using exponential filtering).

In some implementations, the modified calibration parameter(s) may be determined based a regression approach. The regression approach may include iterative adjustments of the calibration parameter(s) to arrive at calibration parameter(s) that gives acceptable amount of error between predicted positions of pixels and actual positions of pixels. The regression approach may use an estimate of the calibration parameter(s) to start the computation, and the calibration(s) parameters may be iteratively adjusted until they fit the data.

In the regression approach, the following error function may be minimized to determine the modified calibration parameter(s):

$$E = \sum_{frames:t} \sum_{points:j} \rho\left(\|D^{-1}(m_{1,j,t} + f_{12,j,t}) - RD^{-1}(m_{1,j,t})\|^2\right)$$

In some implementations, gradient decent may be used to determine the modified calibration parameter(s). In some implementations, regularization may be used to determine the modified calibration parameter(s). In some implementations, one or more additional parameters may need to be taken into account. For example, for new medium scenarios, an additional parameter r (random Gaussian variable of mean mu and standard deviation sigma, $r \sim N(\mu,\sigma)$) may need to be found so that θ becomes $\theta_r$, and the parameters of the function D may be given by:

$$\theta_{optimal} = \mathrm{argmin}_r E(\theta_r) + \lambda \log(P(r))$$

In some implementations, more complex computation may be performed using a mixture of Gaussian modeling of possible distortion, such as a Gaussian Mixture Model where $\theta \sim GMM(\theta_1, \sigma_1, \ldots, \theta_N, \sigma_N)$, which may bring the regression approach closer to classification approach:

$$\theta = \mathrm{argmin}_\theta E(\theta) + \log(p(\theta))$$

The operation component 110 may be configured to effectuate operation of the image capture device based on the one or more modified calibration parameters and/or other information. Operation of the image capture device may refer to one or more ways in which the image capture device operates. Operation of the image capture device may refer to one or more methods and/or one or more manners of functioning of the image capture device. Effectuating operation of the image capture device based on the modified calibration parameter(s) may include causing the image capture device to operate in particular way(s) based on the modified calibration parameter(s). Effectuating operation of the image capture device based on the modified calibration parameter(s) may include causing the image capture device to function in particular manner(s) and/or using particular method(s) based on the modified calibration parameter(s). For example, the image capture device may be operated in accordance with the modified calibration parameter(s).

In some implementations, effectuating operation of the image capture device based on the modified calibration parameter(s) may include setting the operating calibration parameters of the image capture device based on the modified calibration parameter(s). The calibration parameter(s) of the image capture device may be changed to be same as/in accordance with the modified calibration parameter(s).

In some implementations, the operation of the image capture device may be changed based on the modified calibration parameter(s) and/or other information. The modified calibration parameter(s) may be compared with the calibration parameter(s) being used by the image capture device (operating calibration parameter(s)). Responsive to difference between the modified calibration parameter(s) with the operating calibration parameter(s), the operating calibration parameter(s) may be changed to be same as the modified calibration parameter(s). For example, the image capture device may be operating using calibration parameters for the optical element (lens) of the image capture device. The characteristics of the optical medium through which images are being captured may be different from the characteristic of the lens of the image capture device (e.g., due to installation of a lens extension, due to immersion in water). The operating calibration parameter(s) of the image capture device may be changed in accordance with the modified calibration parameter(s) that accounts for how the optical medium affects direction, deviation, and/or path of the light passing through the optical medium. Thus, the image capture device operation may be changed automatically through dynamic optical medium calibration.

The modified calibration parameter(s) may be used to calibrate one or more features of the image capture device, such as electronic image stabilization, image leveling, stitching, and/or image analysis. For example, the modified calibration parameter(s) may be used in operating the image capture device to perform image stabilization, leveling, stitching, and/or correction (e.g., chromatic aberration correction, vignetting correction). Other usage of the modified calibration parameter(s) are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
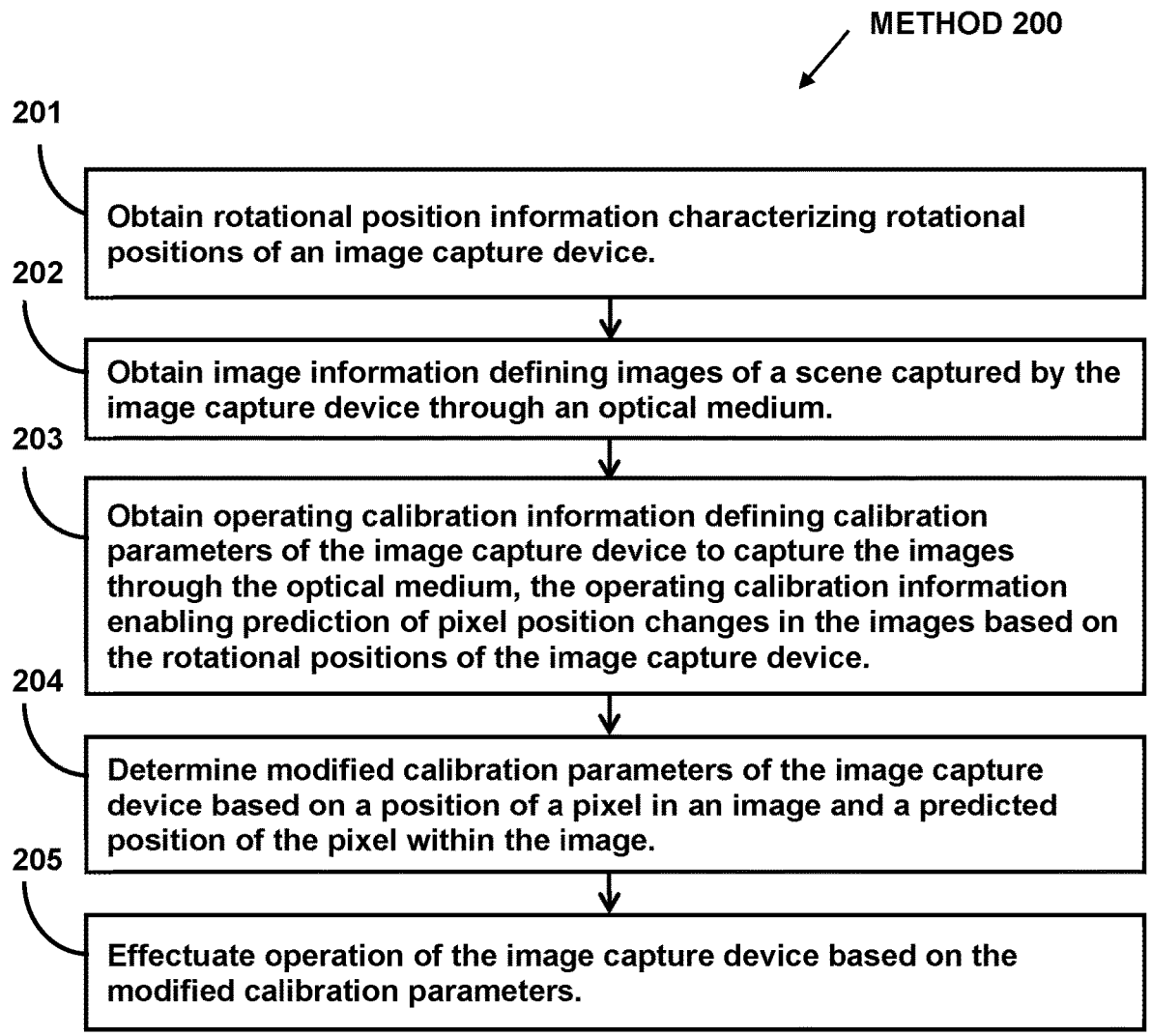
FIG. 2 illustrates an example method for dynamic optical medium calibration.

FIG. 2 illustrates method 200 for dynamic optical medium calibration. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, rotational position information may be obtained. The rotational position information may characterize rotational positions of an image capture device as a function of progress through a capture duration. The rotational positions of the image capture device may include a first rotational position of the image capture device at a first moment within the capture duration, a second rotational position of the image capture device at the second moment within the capture duration, and/or other rotational positions of the image capture device. In some implementation, operation 201 may be performed by a processor component the same as or similar to the position information component 102 (Shown in FIG. 1 and described herein).

At operation 202, image information may be obtained. The image information may define images of a scene captured by the image capture device through an optical medium during the capture duration. The images may include a first image captured at the first moment within the capture duration, a second image captured at the second moment within the capture duration, and/or other images. The first image and the second image may include one or more pixels depicting an object within the scene. The pixel(s) may be located at a first position within the first image based on the first rotational position of the image capture device at the first moment, and the pixel(s) may be located at a second position different from the first position within the second image based on the second rotational position of the image capture device at the second moment. In some implementation, operation 202 may be performed by a processor component the same as or similar to the image information component 104 (Shown in FIG. 1 and described herein).

At operation 203, operating calibration information may be obtained. The operating calibration information may define one or more calibration parameters of the image capture device to capture the images through the optical medium during the capture duration. The operating calibration information may enable prediction of a change in position of the pixel(s) from the first position within the first image to a predicted position within the second image based on the first rotational position of the image capture device at the first moment, the second rotational position of the image capture device at the second moment, and/or other information. In some implementation, operation 203 may be performed by a processor component the same as or similar to the calibration component 106 (Shown in FIG. 1 and described herein).

At operation 204, one or more modified calibration parameters of the image capture device to capture additional images through the optical medium may be determined based on the second position of the pixel(s) within the second image, the predicted position of the pixel(s) within the second image, and/or other information. In some implementation, operation 204 may be performed by a processor component the same as or similar to the modified calibration component 108 (Shown in FIG. 1 and described herein).

At operation 205, operation of the image capture device may be effectuated based on the modified calibration parameter(s) and/or other information. In some implementation, operation 205 may be performed by a processor component the same as or similar to the operation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for dynamic optical medium calibration, the system comprising:
  one or more physical processors configured by machine-readable instructions to:
    obtain rotational position information of an image capture device, the rotational position information characterizing rotational positions of the image capture device as a function of progress through a capture duration, the rotational positions of the image capture device including a first rotational position of the image capture device at a first moment within the capture duration and a second rotational position of the image capture device at the second moment within the capture duration;
    obtain image information defining images of a scene captured by the image capture device through an optical medium during the capture duration, the images including a first image captured at the first moment within the capture duration and a second image captured at the second moment within the capture duration, the first image and the second image including a pixel depicting an object within the scene, the pixel located at a first position within the first image based on the first rotational position of the image capture device at the first moment, the pixel located at a second position different from the first position within the second image based on the second rotational position of the image capture device at the second moment;
    obtain operating calibration information of the image capture device, the operating calibration information defining one or more default calibration parameters of the image capture device to capture the images through a default optical medium in which the images are captured solely through an optical element of the image capture device, wherein the operating calibration information enables prediction of a change in position of the pixel from the first position within the first image to a predicted position within the second image based on the first rotational position of the image capture device at the first moment and the second rotational position of the image capture device at the second moment;

automatically determine, based on the second position of the pixel within the second image and the predicted position of the pixel within the second image, that the optical medium through which the images are captured by the image capture device is different from the default optical medium in which the images are captured solely through the optical element of the image capture device, wherein one or more modified calibration parameters of the image capture device are selected for the optical medium from among predefined calibration parameters, the predefined calibration parameters including different predefined calibration parameters for different types of optical medium; and effectuate operation of the image capture device based on the one or more modified calibration parameters.

2. The system of claim 1, wherein the optical medium through which the images are captured by the image capture device are automatically determined to be different from the default optical medium in which the images are captured solely through the optical element of the image capture device based on a difference between the second position of the pixel within the second image and the predicted position of the pixel within the second image.

3. The system of claim 1, wherein the optical medium through which the images are captured by the image capture device are automatically determined to be different from the default optical medium in which the images are captured solely through the optical element of the image capture device based on a first optical flow corresponding to the second position of the pixel within the second image and a predicted optical flow corresponding to the predicted position of the pixel within the second image.

4. The system of claim 1, wherein the determination that the optical medium through which the images are captured by the image capture device is different from the default optical medium in which the images are captured solely through the optical element of the image capture device includes determination that the optical medium through which the images are captured by the image capture device has changed.

5. The system of claim 1, wherein the determination that the optical medium through which the images are captured by the image capture device is different from the default optical medium in which the images are captured solely through the optical element of the image capture device includes determination that the optical medium includes an optical element extension installed on the optical element of the image capture device.

6. The system of claim 1, wherein the determination that the optical medium through which the images are captured by the image capture device is different from the default optical medium in which the images are captured solely through the optical element of the image capture device includes determination that the optical medium includes an interchangeable optical element installed in place of the optical element of the image capture device.

7. The system of claim 1, wherein the determination that the optical medium through which the images are captured by the image capture device is different from the default optical medium in which the images are captured solely through the optical element of the image capture device includes determination that the image capture device has been submerged under water.

8. The system of claim 7, wherein the optical medium is determined to include water in front of the optical element of the image capture device.

9. A method for dynamic optical medium calibration, the method performed by a computing system including one or more processors, the method comprising:

obtaining, by the computing system, rotational position information of an image capture device, the rotational position information characterizing rotational positions of the image capture device as a function of progress through a capture duration, the rotational positions of the image capture device including a first rotational position of the image capture device at a first moment within the capture duration and a second rotational position of the image capture device at the second moment within the capture duration;

obtaining, by the computing system, image information defining images of a scene captured by the image capture device through an optical medium during the capture duration, the images including a first image captured at the first moment within the capture duration and a second image captured at the second moment within the capture duration, the first image and the second image including a pixel depicting an object within the scene, the pixel located at a first position within the first image based on the first rotational position of the image capture device at the first moment, the pixel located at a second position different from the first position within the second image based on the second rotational position of the image capture device at the second moment;

obtaining, by the computing system, operating calibration information of the image capture device, the operating calibration information defining one or more default calibration parameters of the image capture device to capture the images through a default optical medium in which the images are captured solely through an optical element of the image capture device, wherein the operating calibration information enables prediction of a change in position of the pixel from the first position within the first image to a predicted position within the second image based on the first rotational position of the image capture device at the first moment and the second rotational position of the image capture device at the second moment;

automatically determining, by the computing system, based on the second position of the pixel within the second image and the predicted position of the pixel within the second image, that the optical medium through which the images are captured by the image capture device is different from the default optical medium in which the images are captured solely through the optical element of the image capture device, wherein one or more modified calibration parameters of the image capture device are selected for the optical medium from among predefined calibration parameters, the predefined calibration parameters including different predefined calibration parameters for different types of optical medium; and effectuating, by the computing system, operation of the image capture device based on the one or more modified calibration parameters.

10. The method of claim 9, wherein the optical medium through which the images are captured by the image capture device are automatically determined to be different from the default optical medium in which the images are captured solely through the optical element of the image capture device based on a difference between the second position of the pixel within the second image and the predicted position of the pixel within the second image.

11. The method of claim 9, wherein the optical medium through which the images are captured by the image capture device are automatically determined to be different from the default optical medium in which the images are captured solely through the optical element of the image capture device based on a first optical flow corresponding to the second position of the pixel within the second image and a predicted optical flow corresponding to the predicted position of the pixel within the second image.

12. The method of claim 9, wherein determining that the optical medium through which the images are captured by the image capture device is different from the default optical medium in which the images are captured solely through the optical element of the image capture device includes determining that the optical medium through which the images are captured by the image capture device has changed.

13. The method of claim 9, wherein determining that the optical medium through which the images are captured by the image capture device is different from the default optical medium in which the images are captured solely through the optical element of the image capture device includes determining that the optical medium includes an optical element extension installed on the optical element of the image capture device.

14. The method of claim 9, wherein determining that the optical medium through which the images are captured by the image capture device is different from the default optical medium in which the images are captured solely through the optical element of the image capture device includes determining that the optical medium includes an interchangeable optical element installed in place of the optical element of the image capture device.

15. The method of claim 9, wherein determining that the optical medium through which the images are captured by the image capture device is different from the default optical medium in which the images are captured solely through the optical element of the image capture device includes determining that the image capture device has been submerged under water.

16. The method of claim 15, wherein the optical medium is determined to include water in front of the optical element of the image capture device.

17. A system for dynamic optical medium calibration, the system comprising:
one or more physical processors configured by machine-readable instructions to:
obtain rotational position information of an image capture device, the rotational position information characterizing rotational positions of the image capture device as a function of progress through a capture duration, the rotational positions of the image capture device including a first rotational position of the image capture device at a first moment within the capture duration and a second rotational position of the image capture device at the second moment within the capture duration;
obtain image information defining images of a scene captured by the image capture device through an optical medium during the capture duration, the images including a first image captured at the first moment within the capture duration and a second image captured at the second moment within the capture duration, the first image and the second image including a pixel depicting an object within the scene, the pixel located at a first position within the first image based on the first rotational position of the image capture device at the first moment, the pixel located at a second position different from the first position within the second image based on the second rotational position of the image capture device at the second moment;
obtain operating calibration information of the image capture device, the operating calibration information defining one or more default calibration parameters of the image capture device to capture the images through a default optical medium in which the images are captured solely through an optical element of the image capture device, wherein the operating calibration information enables prediction of a change in position of the pixel from the first position within the first image to a predicted position within the second image based on the first rotational position of the image capture device at the first moment and the second rotational position of the image capture device at the second moment;
automatically determine, based on a difference between the second position of the pixel within the second image and the predicted position of the pixel within the second image, that the optical medium through which the images are captured by the image capture device has changed from the default optical medium in which the images are captured solely through the optical element of the image capture device, wherein one or more modified calibration parameters of the image capture device are selected for the optical medium from among predefined calibration parameters, the predefined calibration parameters including different predefined calibration parameters for different types of optical medium; and
effectuate operation of the image capture device based on the one or more modified calibration parameters.

18. The system of claim 17, the determination that the optical medium through which the images are captured by the image capture device has changed from the default optical medium in which the images are captured solely through the optical element of the image capture device includes determination that the optical medium has changed to include an optical element extension installed on the optical element of the image capture device.

19. The system of claim 17, wherein the determination that the optical medium through which the images are captured by the image capture device has changed from the default optical medium in which the images are captured solely through the optical element of the image capture device includes determination that the optical medium has changed to include an interchangeable optical element installed in place of the optical element of the image capture device.

20. The system of claim 17, wherein the determination that the optical medium through which the images are captured by the image capture device has changed from the default optical medium in which the images are captured solely through the optical element of the image capture device includes determination that the optical medium has changed to include water in front of the optical element of the image capture device from the image capture device being submerged under water.

* * * * *